(12) United States Patent
Hughes

(10) Patent No.: US 6,448,332 B1
(45) Date of Patent: Sep. 10, 2002

(54) ACRYLONITRILE/STYRENE/ACRYLIC/ POLYMERIC COMPOSITIONS AND METHODS FOR MAKING SAME

(75) Inventor: Roderick E. Hughes, Newport Beach, CA (US)

(73) Assignee: Hughes Processing, Inc., Costa Mesa, CA (US)

( * ) Notice: Subject to any disclaimer, the term of this patent is extended or adjusted under 35 U.S.C. 154(b) by 0 days.

(21) Appl. No.: 09/488,287

(22) Filed: Jan. 20, 2000

(51) Int. Cl.$^7$ .................... C08F 255/00; C08F 261/00
(52) U.S. Cl. .................... 525/64; 525/69; 525/70; 525/71; 525/78; 525/80; 525/86; 525/87
(58) Field of Search .................. 525/64, 93, 69, 525/70, 71, 80, 86, 87

(56) References Cited

U.S. PATENT DOCUMENTS

| | | |
|---|---|---|
| 3,408,424 A | 10/1968 | Barkhuff |
| 3,444,269 A | 5/1969 | Beer |
| 3,489,821 A | 1/1970 | Witt et al. |
| 3,489,822 A | 1/1970 | Witt et al. |
| 3,632,675 A | 1/1972 | Foglesong et al. |
| 3,642,950 A | 2/1972 | O'Shea |
| 3,711,575 A | 1/1973 | Kakefuda et al. |
| 3,734,814 A * | 5/1973 | Davis, Sr. et al. .......... 161/112 |
| 3,780,140 A | 12/1973 | Hammer |
| 3,808,180 A | 4/1974 | Owens |
| 3,943,103 A | 3/1976 | Borden et al. |
| 3,944,631 A | 3/1976 | Yu et al. |
| 4,111,876 A | 9/1978 | Bailey et al. |
| 4,239,673 A | 12/1980 | Lee, Jr. |
| 4,248,778 A | 2/1981 | Arnold et al. |
| 4,424,303 A | 1/1984 | Liu |
| 4,517,339 A | 5/1985 | Aliberto et al. |
| 4,537,933 A | 8/1985 | Walker et al. |
| 4,576,860 A | 3/1986 | Fink et al. |
| 4,663,390 A | 5/1987 | Dean |
| 4,731,414 A | 3/1988 | Ting |
| 4,780,506 A | 10/1988 | Wefer |
| 4,831,079 A | 5/1989 | Ting |
| 4,985,497 A | 1/1991 | Kamins et al. |
| 5,086,113 A | 2/1992 | Kamins et al. |
| 5,104,934 A | 4/1992 | Udipi |
| 5,122,571 A | 6/1992 | Westeppe et al. |
| 5,210,134 A | 5/1993 | Akkapeddi et al. |
| 5,290,859 A | 3/1994 | Niessner et al. |
| 5,405,083 A * | 4/1995 | Moses ...................... 239/428 |
| 5,447,989 A | 9/1995 | Mylonakis et al. |
| 5,852,113 A * | 12/1998 | Guntherberg et al. ......... 525/64 |
| 5,883,191 A | 3/1999 | Hughes |

OTHER PUBLICATIONS

CRT Lbaoratories, Inc. Test Report For Hughes Processing, Oct. 21, 1999.
Dupont Material Safety Data Sheet for Elvaloy, Dec. 16, 1997.
Union Carbide Corp Material Safety Data Sheet for DPD–6169 NT, Aug. 21, 1998.
Dupont Elvaloy Product Information Sheet. Mar. 1999.
Dupont Elvaloy Selector Guide. Nov. 1995.
Dupont Elvaloy Ep 4051 Product Information Sheet, Jul. 1997.
Uniroyal Chemical Royaltuf 372P20 Product Information Sheet, 1998.

* cited by examiner

*Primary Examiner*—Jeffrey Mullis
(74) *Attorney, Agent, or Firm*—Stout, Uxa, Buyan & Mullins; Frank J. Uxa

(57) ABSTRACT

Compositions which have substantial weatherability and impact resistance include a substantially uniform blend of an acrylonitrile/styrene/acrylic polymeric material and a component selected from (A) polymeric materials including units derived from ethylene, carbon monoxide and copolymerizable ethylenically unsaturated organic compounds, (B) graft polymer components including ethylene-propylene-non-conjugated diene terpolymers grafted with styrene and acrylonitrile monomers, and mixtures thereof. Methods for making such compositions include forming a substantially uniform physical mixture of such polymeric material and component.

11 Claims, No Drawings

ACRYLONITRILE/STYRENE/ACRYLIC/ POLYMERIC COMPOSITIONS AND METHODS FOR MAKING SAME

BACKGROUND OF THE INVENTION

The present invention relates to compositions comprising acrylonitrile/styrene/acrylic ("ASA") polymeric materials and to methods for making such compositions. More particularly, the invention relates ASA polymeric materials which have one or more enhanced properties, such as impact resistance.

ASA polymeric materials are known and have been used in various applications which have taken advantage of the excellent properties, for example, weatherability, of such materials. As used herein, the term "weatherability" refers to the ability or property of a material to effectively withstand the conditions of an out-of-doors environment over a long period of time, for example, at least five years and preferably at least seven years, with substantially no degradation or decomposition.

ASA polymeric materials include, for example, those disclosed in Kakefuda et al U.S. Pat. No. 3,711,575, which provides an ASA terpolymer, prepared by grafting acrylate to styrene/acrylonitrile copolymer. Although such ASA terpolymers have good weatherability, they are difficult and cumbersome to produce.

Yu U.S. Pat. No. 3,994,631, disclosed a method for forming an ASA interpolymer wherein the acrylic polymers interpenetrate a web of styrene/acrylonitrile copolymers through sequence emulsion polymerization. This method, although it does not require grafting, does involve sequential polymerizations.

Recently, Hughes U.S. Pat. No. 5,883,191 disclosed a method of forming an ASA composition with excellent properties by physically mixing styrene/acrylonitrile copolymers and acrylate polymers. No grafting or sequential polymerizations are required.

There continues to be a need in the industry for ASA polymeric materials, particularly ASA materials in which the acrylic polymer is not chemically or covalently bonded to the styrene/acrylonitrile copolymer, to have better physical properties, such as better impact resistance properties.

SUMMARY OF THE INVENTION

New acrylonitrile/styrene/acrylic polymeric material-containing compositions and methods for making such compositions have been discovered. The present invention is based, at least in part, on the discovery that acrylonitrile/ styrene/acrylic (ASA) polymeric materials in which the acrylic polymers are not chemically or covalently bonded to the styrene/acrylonitrile copolymers, for example, including ASA interpolymers and/or physical mixture of styrene/ acrylonitrile copolymers and (meth)acrylate polymers, can be physically blended with certain impact modifiers in a single step, for example, using methodologies which can be cost effectively practiced to provide compositions having controlled and substantially uniform compositions or make-ups with enhanced impact resistance properties.

The present invention is particularly advantageous with ASA polymeric materials which are physical mixtures of styrene/acrylonitrile copolymers and acrylate/methacrylate ((meth)acrylate) polymers, such as described in Hughes U.S. Pat. No. 5,883,191, the disclosure of which is incorporated in its entirety herein by reference. This is so because the final material has enhanced properties, for example, enhanced impact resistance, and can be produced by straightforward physical mixing or blending and without one or more relatively complex polymerization steps being required. Control of the make-up and physical properties of such a physically blended ASA polymeric material is more easily achieved than with compositions involving one or more polymerizations.

In one broad aspect of the present invention, weatherable compositions are provided which comprise a first component selected from ASA polymeric materials in which the acrylic polymer is not chemically or covalently bonded to the styrene/acrylonitrile copolymer and a second component or an impact modifier component in an amount effective to enhance the impact resistance of the compositions. The presently useful second or impact modifier components are selected from (A) polymeric materials including units derived from ethylene, units derived from carbon monoxide and units derived from one or more monomers (termonomers) selected from copolymerizable ethylenically unsaturated organic compounds, for example, acrylic acid, acrylic acid esters and the like and mixtures thereof, hereinafter referred to as acrylates, (B) graft polymer components including ethylene-propylene-non-conjugated diene terpolymers grafted with styrene and acrylonitrile monomers, and mixtures thereof. Such impact modifier components are present in the compositions of the present invention in an amount effective to enhance the impact resistance of the composition relative to a substantially identical composition without the impact modifier component. Preferably, the present compositions have increased IZOD values, for example, increased by at least 0.5 ft. lbs./in. notch and preferably at least about 1 or about 2 ft. lbs./in. notch (ASTM D2965-94(97) test at 23° C.) relative to substantially identical compositions without the second or impact modifier component.

The presently useful second or impact modifier components preferably are present in an amount in a range of about 1% to about 20%, more preferably about 3% or about 5% to about 12% or about 15% by weight of the total weight of the first and second components present. Higher concentrations of the impact modifier components, even within the percentage ranges set forth herein, may :not result in compositions having higher impact resistances.

In one particularly useful embodiment of the present invention, compositions are provided which comprise a substantially uniform physical blend of an uncrossed-linked acrylonitrile/styrene copolymer, for example, a linear uncross-linked acrylonitrile/styrene copolymer, an acrylate copolymer, such as a cross-linked alkyl acrylate/graft (meth) acrylate copolymer, and the impact modifier component, as described herein.

Preferably, weatherable compositions are provided which comprise a substantially uniform blend including (1) a physical mixture of at least about 30% by weight, based on the total weight of the physical mixture, of an uncrossed-linked acrylonitrile/styrene copolymer and at least about 5% by weight, based on the total weight of the physical mixture of a cross-linked alkyl acrylate/graft (meth)acrylate copolymer; and (2) an impact modifier component, as described herein, in an amount effective to enhance impact resistance in the composition.

In order to avoid component incompatibility within (1) above, the present compositions preferably; are substantially free of cross-linked acrylonitrile/styrene copolymers.

As used herein, the terms "physical blend" or "physical mixture" refers to a composition in which the constituent components are combined or mixed with substantially no chemical bonding, in particular with substantially no covalent chemical bonding between the constituents.

The uncross-linked acrylonitrile/styrene copolymers preferably are present in amounts in a range of about 30% to about 95% by weight of the copolymers present. The cross-linked alkyl acrylate/graft (meth)acrylate copolymers preferably are present in amounts in a range of about 5% to about 70% by weight of the copolymers present.

In another broad aspect of the present invention, an ASA interpolymer is blended with an impact modifier component, as described herein, to produce a composition with enhanced impact resistance.

In one particularly useful embodiment of the present invention, the interpolymers preferably are formed from styrene, acrylonitrile and at least one component selected from the group consisting of acrylates, methacrylates and mixtures thereof. The presently useful interpolymers more preferably comprise a crosslinked alkyl (meth)acrylate polymer, crosslinked styrene acrylonitrile polymer and an uncrosslinked styrene-acrylonitrile polymer. The alkyl acrylate polymer, crosslinked styrene acrylonitrile polymer and uncrosslinked styrene-acrylonitrile polymer may be alternating copolymers, random copolymers or block copolymers. Additionally, the alkyl acrylate polymer may also be a homopolymer. The alkyl (meth)acrylate polymer preferably includes units derived from a material selected from a group consisting of $C_2$–$C_{10}$ alkyl acrylates, $C_8$–$C_{22}$ alkyl (meth)acrylates and mixtures thereof. Furthermore, the crosslinked alkyl acrylate and crosslinked styrene-acrylonitrile may be of the following conformations: branched, network, star, comb, ladder or semiladder.

The presently useful interpolymers may be formed by a multi-step, sequential polymerization process, such as is described in Yu U.S. Pat. No. 3,994,631, the disclosure of which is incorporated in its entirety herein by reference.

The interpolymer ASA preferably comprises about 5% to about 50%, by weight, of the alkyl (meth)acrylate component, about 5% to about 35, by weight, of the crosslinked styrene-acrylonitrile component and about 15% to about 90%, by weight, of the uncrosslinked styrene acrylonitrile component.

The present compositions containing ASA component and impact modifier component, as described herein, preferably comprise about 80% to about 99% by weight of the ASA, based on the total weight of ASA and impact modifier component present, and the impact modifier in an amount effective as to achieve the desired impact resistance. More preferably, the compositions comprise about 82% or about 85% to about 95% or about 97% by weight of the ASA component, based on the total weight of ASA and impact modifier components present.

The second or impact modifier component may be selected from polymeric materials including units, that is polymer repeat units, derived from ethylene, units derived from carbon monoxide and units derived from one or more monomers (termonomers) selected from copolymerizable ethylenically unsaturated organic compounds, for example, acrylic acid, acrylic acid esters and the like and mixtures thereof, hereinafter referred to as acrylates. Such polymeric materials can be produced using conventional and/or well known procedures, for example, procedures detailed in Hammer U.S. Pat. No. 3,780,140, the disclosure of which is incorporated in its entirety herein by reference. A particularly useful polymeric material in accordance with the present invention is the material sold by Dupont under the trademark ELVALOY® EP 4051.

The second or impact modifier component may be selected from graft polymer components including ethylene-propylene-non-conjugated diene terpolymers grafted with styrene and acrylonitrile monomers. Such graft polymers can be produced using conventional and/or well known procedures. For example, see: Wefer U.S. Pat. No. 4,780,506; Witt et al U.S. Pat. No. 3,489,821; Witt et al U.S. Pat. No. 3,489,822; and O'Shea et al U.S. Pat. No. 3,642,950. The disclosure of each of these patents is incorporated in its entirety herein by reference. A particularly useful graft polymer component in accordance with the present invention is a composition sold by UniRoyal Chemical under the trademark ROYALTUF® 372P20.

Mixtures of two or more impact modifiers may be included in the present compositions. For example, two or more different polymeric materials and/or graft polymers, as described herein, may be used. Also, one or more of both types of the impact modifiers may be employed.

Optionally, the compositions of this invention may further contain effective amounts of one or more additional agents, such as wood and/or other fillers, pigments, processing aides, lubricants, antioxidants and stabilizers such as ultra-violet light and thermal stabilizers, and the like.

In another broad aspect of the present invention, methods for forming weatherable compositions are provided. Such methods comprise forming a substantially uniform physical blend of the acrylonitrile/styrene/acrylic polymeric material, as described herein, and the impact modifier component, as described herein.

Effective amounts of one or more additional agents, as described herein, can be included in the mixture from which the present composition is made.

The present forming step preferably includes subjecting the mixture of the acrylonitrile/styrene/acrylic polymeric material and the impact modifier component to conditions effective to produce a substantially uniform, flowable or extrudable composition. Such conditions can include, for example, elevated temperature conditions, elevated pressure conditions, shear or mixing conditions and combinations thereof. The forming step more preferably further includes extruding the substantially uniform composition, in particular, extruding the substantially uniform, flowable or extrudable composition, into useful shapes and configurations.

Any and all features described herein and combinations of such features are included within the scope of the present invention provided that the features of any such combination are not mutually inconsistent.

These and other aspects of the present invention are apparent in the following detailed description of the invention.

DETAILED DESCRIPTION

The present compositions can be used to form weatherable, impact resistant articles. For example, the present compositions, alone or in combination, e.g., as a composite, laminate and the like, with one or more other materials can be used to produce articles, such as window coverings, house sidings, and other articles which are resistant to the effects of outdoor weather on a long term basis and, therefore, can be employed out-of-doors. The present compositions can be molded, extruded and/or otherwise formed into shapes and configurations useful in producing such finished product articles. Such finished product articles can include only the compositions of the present invention or can be composites or other combinations of the present compositions with other materials.

In one aspect of the present invention, compositions are provided which comprise substantially uniform blends of uncross-linked acrylonitrile/styrene copolymers, acrylic copolymers, such as cross-linked alkyl acrylate/graft (meth) acrylate copolymers, and impact modifier components, such as (A) polymeric materials including units derived from ethylene, units derived from carbon monoxide and units derived from one or more monomers (termonomers) selected from copolymerizable ethylenically unsaturated organic compounds, for example, acrylic acid, acrylic acid esters and the like and mixtures thereof, hereinafter referred to as acrylates, (B) graft polymer components including ethylene-propylene-non-conjugated diene terpolymers grafted with styrene and acrylonitrile monomers, and mixtures thereof.

In one embodiment, the compositions include at least about 30% by weight, based on the total weight of the above-noted copolymers, of an uncross-linked acrylonitrile/ styrene copolymer and at least about 5% by weight, based on the total weight of the above-noted copolymers, of the acrylic copolymer. The impact modifier component is present in an amount effective to enhance the impact resistance in the final composition relative to a substantially identical component without the impact modifier component. Preferably, the acrylonitrile/styrene copolymer is present in an amount in the range of about 30% to about 95% by weight, based on the total weight of the copolymers, and the cross-linked alkyl acrylate/graft (meth)acrylate copolymer is present in an amount in the range of about 5% to about 70% by weight, based on the total weight of the copolymers; and the impact modifier component is present in an amount in a range of about 1% to about 20%, more preferably about 3% or about 5% to about 12% to about 15%, by weight based on the total weight of acrylonitrile/ styrene copolymer, crosslinked alkyl acrylate/graft(meth) acrylate copolymer and impact modifier component present based on the total weight of the composition.

The uncross-linked acrylonitrile/styrene copolymers useful in the present invention preferably have an acrylonitrile content in the range of about 20% to about 40% by weight, and a styrene content in the range of about 60% to about 80% by weight.

The uncross-linked acrylonitrile/styrene copolymer component can be produced by polymerization, e.g., emulsion or suspension polymerization, of a mixture of acrylonitrile and styrene. See, for example, Yu et al U.S. Pat. No. 3,944,631.

Examples of useful commercially available uncrosslinked acrylonitrile/ styrene copolymers include materials sold under the trademark Blendex 570 and Tyril 860 sold by GE Specialty Chemicals and Dow Chemical, respectively. A particularly useful commercially available uncross-linked, linear acrylonitrile/styrene copolymer is that sold by Bayer under the trademark Lustran, e.g., Lustran 31.

The cross-linked alkyl acrylate/graft (meth)acrylate copolymers preferably included in the compositions of the present invention preferably are multistage elastomers comprised of a cross-linked alkyl acrylate which is graft linked to a poly (meth)acrylate, preferably polymethyl (meth) acrylate. The cross-linked alkyl acrylate/graft (meth)acrylate copolymer includes an alkyl acrylate portion present in a range of about 50% to about 95% by weight of the copolymer, and a (meth)acrylate portion present in a range of about 5% to about 50% by weight of the copolymer The cross-linked alkyl acrylate portion of the cross-linked alkyl acrylate/graft (meth)acrylate preferably is a copolymer containing a major proportion, that is at least 50% by weight, of alkyl and/or aralkyl acrylates, with the inclusion of about 0.05% to about 50% by weight of a polyunsaturated crosslinking comonomer and about 0% to about 10% by weight of a hydrophilic comonomer, ordinarily polymerized from an emulsion or suspension. The alkyl esters of acrylic acid have alkyl groups of 1 to about 15 carbon atoms, preferably 1 to about 8 carbon atoms. Longer chain alkyl groups may be used. Other acrylic monomers, up to about 50 weight percent, less the other inclusions, can also be used, such as aralkyl esters of acrylic acid wherein the cyclic portion contains 5, 6 or 7 carbon atoms with or without an additional alkyl bridge, and the alkyl portion of the aralkyl group containing up to about 15 carbon atoms may also be used. Substituted acrylates or methacrylates including alkylthioalkyl acrylates such as ethyithioethyl acrylate and the like, alkoxyalkyl acrylates, such as methoxyethyl acrylate and the like, can also be used. Interpolymers with these acrylates can be based on up to about 40% by weight of one or more other addition polymerizable monomers such as styrene, alphamethyl styrene, vinyl ethers, amides, and esters, vinyl and vinylidene halides and the like.

The (meth)acrylate portion of the cross-linked alkyl acrylate/graft (meth)acrylate copolymers may be characterized as having the majority (e.g., 50% to 100%) of alkyl (meth)acrylate units. The alkyl (meth)acrylate polymers may contain minor amounts (0% to about 40%) of non-acrylic units to provide well-known balances of physical characteristics. These polymers preferably have a heat distortion temperature greater than about 68° F., more preferably greater than about 120° F. The (meth) acrylate portion may include copolymers of about 50% to 100% alkyl methacrylate, wherein the alkyl group contains 1 to 4, preferably 1, carbon atoms, and 0% to about 50% of one or more other acrylic monomers such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters and other substituents, and 0% to about 40% of other unsaturated monomers including vinyl esters, vinyl ethers, vinyl amides, vinyl ketones, vinyl halides, vinylidene halides, olefins and the like.

Among the hydrophilic monomers which may be included in the cross-linked alkyl acrylate/graft (meth) acrylate copolymers can be, by way of example only, hydroxy-substituted alkyl and aryl acrylates and methacrylates, amino-substituted alkyl and aryl acrylates and methacrylates, polyether acrylates and methacrylates, alkyl-phosphato-alkyl acrylates and methacrylates, alkyl-phosphonoalkyl acrylates and methacrylates, acrylic acid, methacrylic acid, maleic acid, maleic anhydride, N-vinyl pyrrolidone, alkyl and substituted alkyl amides of acrylic acid, and methacrylic acid, acrylamide, methacrylamide and the like.

Graft-linking monomers useful in producing the present cross-linked alkyl acrylate/graft (meth)acrylic copolymers, by way of example only, include allyl group containing compounds, such as allyl esters of ethylenically unsaturated acids. Most preferred are allyl acrylate, allyl methacrylate, diallyl maleate, diallyl fumarate, allyl acid itaconate and the like.

The cross-linked alkyl acrylate/graft (meth)acrylate copolymers preferably include cross-linked n-butyl acrylate-containing polymers and/or methyl methacrylate-containing polymers. In a particularly useful embodiment, the cross-linked alkyl acrylate/graft (meth)acrylate copolymer comprises a two stage polymer having a cross-linked n-butyl acrylate-based rubbery core and a second stage polymerized from methylmethacrylate alone or in combination with styrene.

Especially preferred cross-linked alkyl acrylate/graft (meth)acrylate copolymers include the core-shell polymers of the type available from Rohm & Haas Co. under the trademark Acryloid® KM330 and KM334. These components contain units derived from n-butyl acrylate, alone or in combination with a vinyl aromatic compound. Components of this type are disclosed in Owens U.S. Pat. No. 3,808,180, the disclosure of which is hereby incorporated in its entirety herein by reference.

In another embodiment of the invention, the compositions comprise substantially uniform physical blends or mixtures of interpolymer ASA and impact modifier component, as described elsewhere herein. The compositions, in the embodiment, preferably include the interpolymer in a range of about 80% to about 99% by weight of the total weight of the interpolymer ASA and impact modifier component present. More preferably, the composition includes the interpolymer in an amount in a range of about 85% or about 88% to about 95% or about 97% by weight of the total weight of the interpolymer ASA and impact modifier component present. The amount of the impact modifier component present preferably is about 1% to about 20%, more preferably about 3% or about 5% to about 12% or about 15% of the total weight of the interpolymer ASA and impact modifier component present.

Interpolymer ASA of various types are available form several commercial sources. However, for a good balance of overall properties, including impact, tensile and flexural properties, it is particularly preferred that the selected ASA resin is an interpolymer (i.e. interpenetrating network) comprised of crosslinked (meth)acrylate, crosslinked styrene-acrylonitrile, and uncrosslinked styrene-acrylonitrile components. The term "interpolymer comprised of crosslinked (meth)acrylate, crosslinked styrene-acrylonitrile, and uncrosslinked styrene-acrylonitrile components" is meant to encompass the type of interpolymer composition described in Yu et al U.S. Pat. No. 3,944,631. The aforementioned alkyl acrylate, crosslinked styrene-acrylonitrile and uncrosslinked styrene-acrylonitrile polymers may be alternating copolymers, random copolymers, or block copolymers.. Additionally, the alkyl acrylate polymer may also be a homopolymer. Furthermore, the crosslinked alkyl acrylate and crosslinked styrene-acrylonitrile may be of the following conformations: branched, network, star, comb, ladder or semiladder.

More preferably, the interpolymer is formed by a polymerization process. Commercially available interpolymers which are formed by polymerization include ASA/Blendex 984 (GE Specialty Chemicals), ASA/Centrex 811 (Bayer), ASA/Luran (BASF), and ASA/LI 911 (LG Chemical/Korea).

In general, the presently useful second or impact modifier component is effective to enhance the impact resistance, for example, increase the IZOD value, of the present composition relative to a substantially identical composition without the second or impact modifier component. Such impact modifier components may be selected from (A) polymeric materials including units derived from ethylene, units derived from carbon monoxide and units derived from one or more monomers (termonomers) selected from copolymerizable ethylenically unsaturated or genic compounds, (B) graft polymer components including ethylene-propylene-non-conjugated diene terpolymers grafted with styrene and acrylonitrile monomers, and mixtures thereof. The presently useful second or impact modifier components may be produced using techniques which are well known in the art. In addition, materials which function as the second or impact modifier components in the present compositions are commercially available, but have not previously been used to enhance the impact resistance of physical blends of acrylonitrile/styrene copolymers and acrylic copolymers, or ASA interpolymers.

The second impact modifier component may be selected from polymeric materials as described herein.

The polymeric materials useful in the present invention include units derived from ethylene, carbon monoxide and one or more termonomers which are copolymerizable ethylenically unsaturated organic compounds. Such termonomers preferably are selected from unsaturated mono- and dicarboxylic acids having 3 to about 20 carbon atoms per molecule, esters of such unsaturated mono- or dicarboxylic acids, vinyl esters of saturated carboxylic acids wherein the alkyl group has 1 to about 18 carbon atoms per molecule, vinyl alkyl ethers wherein the acid group has 1 to about 18 carbon atoms per molecule, acrylonitrile, methacrylonitrile, copolymerizable unsaturated hydrocarbons such as alpha-olefins of 3 to about 12 carbon atoms per molecule, ring compounds such as norbornene and vinyl aromatic compounds.

In preparing such polymeric materials commercially available ethylene, carbon monoxide and other monomers of about 100% purity may be used initially and in supplying continuous make-up for the polymerization feed stream. The reactor vessel used is capable of withstanding high pressures and temperatures, and is equipped with a high speed motor-driven stirrer and pressure relief valves, as well as jacketed walls for circulating heating or cooling fluids in order to control temperature. Carbon monoxide and the other monomer(s) are pumped into the ethylene monomer feed stream at the pressure of the reactor, and then the mixture of monomers is pumped at reactor pressure into the reactor, either together or separately. Catalyst, as necessary, is pumped into the reactor through a separate feed line.

A mixture of polymer and monomer exits the reactor, and the pressure is reduced as the mixture flows into a separator. Monomers leave the separator and are either destroyed or pumped for recycle to the reactor together with make-up monomers. Molten polymer leaves the separator in a stream, from which it is cooled and further processed, e.g., the polymer may be cut into suitable sized particles or blended before being cooled with compatible amounts of other polymers, such as polyvinyl chloride, etc., to improve its handling characteristics. Such amounts of polyvinyl chloride are in the range of about 5% to about 30% by weight of polyvinyl chloride and such polymers.

The flow of ethylene, carbon monoxide, other monomer or monomers and catalyst into the reactor is carefully controlled so that they enter the reactor in constant continuous molar ratios and at the same continuous rate at which product and unreacted monomers are discharged from the reactor. The rates and molar ratios preferably are adjusted so as to provide in the product polymer, by weight, about 40% to about 80% ethylene derived units, about 3% to about 30% carbon monoxide derived units, and about 5% to about 60% of other termonomer(s) derived units. Effective stirring, usually at a rate of at least 0.25 horsepower per gallon of reactor volume, is provided in order to keep the reacting monomers in intimate admixture throughout the reactor. The reactor temperature should be at least about 140° C. It is preferred that the reactor temperature be maintained within the range of about 155° to about 300° C., more preferably about 155° to about 255° C., and that the reactor pressure be maintained within the range of about 5000 to about 60,000 p.s.i., preferably about 20,000 to about 35,000 p.s.i.

The free-radical polymerization catalyst employed in the process can be any of those commonly used in the polymerization of ethylene, such as the peroxides, the peresters, the azo compounds, or the percarbonates. Selected compounds within these groups are dilauroyl peroxide, ditertiary butyl peroxide, tertiary butyl perisobutyrate, tertiary butyl peracetate, α,α-azobisisobutyronitrile and other compounds of comparable free-radical activity. Usually, the catalyst will be dissolved in a suitable inert organic liquid solvent such as benene, kerosene, mineral oil or mixtures of solvents. The usual catalyst level is used, i.e., about 25 to 2500 p.p.m., preferably about 75 to 500 p.p.m., based on the weight of the monomers fed to the reactor.

Kamins et al U.S. Pat. No. 4,985,497 discloses such impact modifier components may be terpolymers comprising various amounts of polymer repeat units of ethylene, carbon monoxide and acrylate ester. The disclosure of Kamins et al U.S. Pat. No. 4,985,497 is incorporated in its entirety herein by reference. In one embodiment, the ethylene/carbon monoxide/acrylate ester terpolymer is comprised of about 40% to about 79% by weight of polymer repeat units of ethylene, about 6% to about 20% by weight of polymer repeat units of carbon monoxide, and about 15% to about 40% by weight of polymer repeat units of acrylate ester.

A particularly useful non-graft polymer material in accordance with the present invention is the material sold by Dupont under the trademark ELVALOY® EP 4051.

The second or impact modifier component may be selected from graft polymer components including ethylene-propylene-non-conjugated diene terpolymers grafted with styrene-acrylonitrile.

The grafted monomeric resin comprises the monomers styrene (which also includes substituted styrenes) and acrylonitrile. The styrene: acrylonitrile monomer mole ratios are often in the range of about 90:10 to about 40:60, preferably about 90:10 to about 50:50; and more preferably from about 80:20 to about 60:40.

It will be understood that in practice the product of the graft copolymerization process is actually a mixture of true graft of resin on rubber, that is the ethylene-propylene-non-conjugated diene terpolymer along with a certain amount of separate, ungrafted resin. That is,. the grafting efficiency is not 100 percent. See: Peascoe U.S. Pat. No. 4,202,948, the disclosure of which incorporated in its entirety herein by reference.

Methods by which the styrene/acrylonitrile graft resin can graft onto the ethylene-propylene-non-conjugated diene terpolymer is set forth in detail in Witt et al U.S. Pat. No. 3,489,821; Witt et al U.S. Pat. No. 3,489,822; and O'Shea et al U.S. Pat. No. 3,642,950.

The graft copolymers of the present invention include a graft resin constituency, that is a styrene/acrylonitrile concentration, comprising about 5% to about 75% by weight, based on a total weight of the graft polymer component. More preferably, the graft resin comprises about 30% to about 70% by weight, based on the total weight of the graft copolymer. Still more preferably, the graft resin comprises about 40% to about 60% by weight, based on the total weight of the graft polymer component.

The polymer to which the graft resin is attached may be characterized by a weight ratio of ethylene to propylene in the range of about 50:50 to about 75:25.

Optionally, the compositions of this invention may further contain effective amounts of one or more additional agents, such as fillers, for example, wood, pigments, processing aides, lubricants, antioxidants and stabilizers such as ultraviolet light and thermal stabilizers, and the like.

In another broad aspect of the present invention, methods for forming weatherable compositions are provided. Such methods preferably involve providing an acrylonitrile/styrene/acrylate polymeric material; and providing an impact modifier component, as described elsewhere herein. The methods comprise forming a substantially uniform physical blend of a acrylonitrile/styrene/acrylic polymeric material and an impact modifier component, as described elsewhere herein.

The present forming step preferably includes subjecting the mixture of the acrylonitrile/styrene/acrylic polymeric material and the impact modifier component to conditions effective to produce a substantially uniform, flowable or extrudable composition. Other additives may also be added. Such cbnditions can include, for example, elevated temperature conditions, elevated pressure conditions, shear or mixing conditions and combinations thereof. The forming step more preferably further includes extruding the substantially uniform composition, in particular, extruding the substantially uniform, flowable or extrudable composition, into useful shapes and configurations.

One particular method of the present invention for forming a weatherable composition comprises providing an uncross-linked acrylonitrile/styrene copolymer; providing a cross-linked alkyl acrylate/graft (meth)acrylate copolymer; providing an impact modifier component and forming a substantially uniform physical blend of these two copolymers and the impact modifier component. This physical blend preferably is substantially free of cross-linked acrylonitrile/styrene copolymer.

Blending of the formulation of the present invention can be achieved by any of the well-known polymer blending techniques, such as two-roll or Banbury mixing, single or multiple screw extrusion, or any other method which applies sufficient heat (temperature) and/or pressure and/or shear (mixing) to the ingredients to obtain an uniform blend. Typical temperatures are in a range of about 300° F. or about 325° F. to about 450° F. or about 475° F., while typical elevated pressures are in a range of about 750 psi or about 1000 psi to about 2000 psi or more. At such temperatures and/or pressures, the shear or mixing force typically generated in the above-noted mixing or extrusion systems is sufficient to obtain the desired, substantially uniform blend.

The following non-limiting examples illustrate certain advantages of the present invention.

EXAMPLES 1 TO 10

The following formulations are prepared by combining the listed ingredients:

| | Ex. 1 wt % | Ex. 2 wt % | Ex. 3 wt % | Ex. 4 wt % |
|---|---|---|---|---|
| Uncross-linked, linear acrylonitrile/styrene copolymers[1] | 63.4 | 63.4 | 63.4 | 63.4 |
| Cross-linked n-butyl acrylate/graft methyl (meth) acrylate copolymer[2] | 22.5 | 20.0 | 22.5 | 20.0 |
| Styrene/acrylonitrile modified ethylene-propylene-nonconjugated diene[3] | 7.5 | 10.0 | — | — |
| Ethylene carbon monoxide/ | — | — | 7.5 | 10.0 |

-continued

| | Ex. 1 wt % | Ex. 2 wt % | Ex. 3 wt % | Ex. 4 wt % |
|---|---|---|---|---|
| acrylate polymer[4] | | | | |
| Lubricant[5] | 1.0 | 1.0 | 1.0 | 1.0 |
| Titanium Dioxide | 5.0 | 5.0 | 5.0 | 5.0 |
| Phosphite stabilizer[6] | 0.4 | 0.4 | 0.4 | 0.4 |
| Stearic acid | 0.2 | 0.2 | 0.2 | 0.2 |

[1]Sold by Bayer under the trademark Lustran 31 (contains about 23% by weight of acrylonitrile).
[2]Sold by Rohm & Haas Co. under the trademark Paraloid KM334.
[3]Sold by UniRoyal Chemical under the trademark Royaltuf 372P20
[4]Sold by DuPont under the trademark Elvaloy HP/EP-4051
[5]Sold by Struktol Corporation under the trademark TR-251, metal stearate/amide composition effective as lubricant.
[6]Sold by GE Specialty Chemicals under the trademark Weston 619.

| | Ex. 5 wt % | Ex. 6 wt % | Ex. 7 wt % | Ex. 8 wt % | Ex. 9 wt % | Ex. 10 wt % |
|---|---|---|---|---|---|---|
| Uncross-linked, linear acrylonitrile/styrene copolymers[1] | 63.4 | 63.4 | 63.4 | 63.4 | 63.4 | 67.9 |
| Cross-linked n-butyl acrylate/graft methyl (meth) acrylate copolymer[2] | 22.5 | 22.5 | 22.5 | 22.5 | 22.5 | 20.0 |
| Lubricant[5] | 1.0 | 1.0 | 1.0 | 1.0 | 1.0 | 1.0 |
| Titanium Dioxide | 5.0 | 5.0 | 5.0 | 5.0 | 5.0 | 5.0 |
| Phosphite stabilizer[6] | 0.4 | 0.4 | 0.4 | 0.4 | 0.4 | 0.4 |
| Stearic acid | 0.2 | 0.2 | 0.2 | 0.2 | 0.2 | 0.2 |
| Ethylene ethylacrylate[7] | 7.5 | | | | | |
| Ethylene maleic anhydride[8] | | 7.5 | | | | |
| Ethylene maleic anhydride[9] | | | 7.5 | | | |
| Ethylene methacrylate[10] | | | | 7.5 | | |
| Ethylene methacrylate[11] | | | | | 7.5 | |
| Synthetic wax [12] | | | | | | 0.3 |
| High molecular wt. PVC resin[13] | | | | | | 4.4 |
| Acrylate with lubricants[14] | | | | | | 0.8 |

[7]Sold by Union Carbide under the trademark Flexomer DPD 6169. Believed to be a copolymer modified or grafted with silane.
[8]Sold by Union Carbide under the trademark Flexomer DEFB1373
[9]Sold by Equistar under the trade name Plexar PX5332
[10]Sold by Exxon under the trademark Optema TC 221
[11]Sold by Exxon under the trademark Optema TC 140
[12]Sold by Henkel Corp. under the trademark Loxiol H.O.B. 7119
[13]Sold by Colorite under the trademark Vinylit
[14]Sold by Rohm & Haas Co. under the trademark Acryloid K-175

Each of these formulations is thoroughly mixed at elevated temperatures of about 400° F.–450° F. (which is the melt temperature range of these formulations) to form a substantially uniform, extrudable composition.

Each of the above formulations is evaluated and has the following impact resistance (average of more than one test):

| | Ex. 1 | Ex. 2 | Ex. 3 | Ex. 4 | Ex. 5 |
|---|---|---|---|---|---|
| IZOD, ASTM D3965-94(97), 23° C., ft. lbs./in. notch | 3 | 1.6 | 4.3 | 3 | 0.8 |

| | Ex. 6 | Ex. 7 | Ex. 8 | Ex. 9 | Ex. 10 |
|---|---|---|---|---|---|
| IZOD, ASTM D3965-94(97), 23° C., ft. lbs./in. notch | 1.0 | 0.9 | 0.9 | 0.5 | 0.6 |

These results indicate that the compositions mixed with an impact modifier comprising a polymer material including units derived from ethylene, carbon monoxide and and acrylates (Examples 3 and 4) and a graft polymer component including ethylene-propylene-non-conjugated diene terpolymers grafted with styrene and acrylonitrile monomers (Examples 1 and 2) have substantially better IZOD values, indicative of better impact resistance, than compositions that do not, that is Examples 5 to 10. Compositions similar to the compositions of Examples 1 to 4 but without the above-noted impact modifiers have IZOD values similar to the IZOD values obtained in Examples 5 to 10.

EXAMPLES 11 TO 14

Each of the compositions that is produced in Examples 1 to 4 is successfully formed into pellets using a Cincinnati Milacron Model CM-80 conical twin screw extruder and a Beringer Water Ring Pelletizer. In each following conditions are employed.

| Barrel Zone 1 | 325° F. |
|---|---|
| Barrel Zone 2 | 325° F. |
| Barrel Zone 3 | 365° F. |
| Barrel Zone 4 | 365° F. |
| Adaptor Zone 1 | 365° F. |
| Adaptor Zone 2 | 365° F. |
| Screenchanger Zone 3 | 365° F. |
| Die Zone 4 | 375° F. |
| Die Zone 5 | 375° F. |
| Screw Oil | 350° F. |
| Motor, RPM | 2000 |
| Motor Load, amps | 110 |

EXAMPLES 15 TO 18

A sample of the pellets produced in each of Examples 11 to 14 is successfully extruded as a cap material over a rigid acrylonitrile/butadiene/styrene (ABS) foam material using a 1.75 inch, 24:1 L/D Akron extruder. The following conditions are used:

| Barrel Zone 1 | 310 |
|---|---|
| Barrel Zone 2 | 330 |
| Barrel Zone 3 | 350 |
| Die Zone 1 | 360 |
| Die Zone 2 | 360 |
| Capping Head | 360 |
| Screw, RPM | 24 |
| Motor Load, amps | 18 |

The pellets and capped ABS articles produced in the Examples are found to have sufficient weatherability to be used out-of-doors on a long term basis. In addition, these pellets, capped ABS articles have enhanced satisfactory impact resistance. These pellets and capped ABS articles, in accordance with the present invention, provide enhanced performance, for example, because of the impact modifiers described herein, relative to pellets and capped ABS articles made using similar pellets without such impact modifiers.

While this invention has been described with respect to various specific examples and embodiments, it is to be understood that the invention is not limited thereto and that it can be variously practiced within the scope of the following claims.

What is claimed is:
1. A composition comprising a physical mixture of about 80% to about 99% by weight of (1) a physical blend of an uncross-linked acrylonitrile/styrene copolymer and a cross-linked alkyl acrylace/grafr(meth)acrylate copolymer, said blend having a substantially uniform make-up; and (2) an additional component selected from the group consisting of (A) polymeric materials of units derived from ethylene, units derived from carbon monoxide and units derived from one or more monomers selected from the group consisting of copolymerizable ethylenically unsaturated organic compounds, (B) graft polymer components of ethyielne-propylene-non-conjugted diene terpolymrers grafted with styrene and acrylonitrile monomers, and mixtures thereof, said additional component being present in an amount effective to enhance the impact resistance of the composition relative to a substantially identical composition without said component.

2. The composition of claim 1 wherein said physical blend is substantially free of cross-linked acrylonitrile/styrene copolymer.

3. The composition of claim 1 wherein the additional component is present in an amount in the range of about 1% to about 20% by weight of the total weight of (1) and (2) present.

4. The composition of claim 1 wherein the additional component is present in an amount in the range of about 3% to about 15% by weight of the total weight of (1) and (2) present.

5. The composition of claim 1 wherein said uncross-linked acrylonitrile/styrene copolymer is present in an amount in a range of about 30% to about 90% by weight based on the total weight of (1) and said cross-linked alkyl acrylate/graft(menh)acrylate copolymer is present in an amount in a range of about 5% to about 70% by weigh based on the total weight of (1).

6. The composition of claim 1 wherein said cross-linked alkyl acrylate/graft(meth)acrylate is of cross-linked n-butyl acrylate-containing polymer and methyl methacrylate-containing polymer.

7. The composition of claim 1 wherein the polymeric materials are of units derived from acrylates.

8. The composition of claim 1 which further comprises wood in an amount effective as a filler in the composition.

9. The composition of claim 1 which further comprises an effective amount of a lubricant.

10. A method for forming a weatherable resin composition comprising:

forming a physical mixture having a substantially uniform. make-up of about 80% to about 99% by weight of an uncross-linked acrylonitrile/styrene copolymer, a cross-linked alkyl acrylate/graft (meth)acrylate copolymer, and (2) an additional component selected from the group consisting of (A) polymeric materials of units derived from ethylene, units derived from carbon monoxide and units derived from one or more monomers selected from the group consisting of copolymerizable ethylenically unsaturated organic compounds, (B) graft polymer components of ethylene-propylene-non-conjugated diene terpolymers grafted with styrene and acrylonitrile monomers, said physical mixture having enhanced impact resistance relative to a substantially identical physical mixture without said additional component.

11. The method of claim 10 wherein said forming step includes subjecting a mixture of said uncross-linked acrylonitrile/styrene copolymer, said cross-linked alkyl acrylate/graft (meth)acrylate copolymer and said component to conditions effective to produce a flowable or extrudable composition having a substantially uniform make-up.

* * * * *

UNITED STATES PATENT AND TRADEMARK OFFICE
CERTIFICATE OF CORRECTION

PATENT NO. : 6,448,332 B1
DATED : September 10, 2002
INVENTOR(S) : Hughes

It is certified that error appears in the above-identified patent and that said Letters Patent is hereby corrected as shown below:

Column 3,
Line 39, "35" should read -- 35% --.

Column 5,
Line 35, "acrylate/graft(meth)" should read -- acrylate/graft (meth) --.

Column 10,
Line 17, "cbnditions" should read -- conditions --.

Column 13,
Line 2, "acrylace/grafr(meth)" should read -- acrylate/graft (meth) --.
Line 9, "ethylielne" should read -- ethylene --.
Line 10, "conjugted" should read -- conjugated --.
Line 31, "acrylate/graft(menh)acrylate" should read -- acrylate/graft (meth)acrylate --.
Line 32, "weigh" should read -- weight --.
Line 35, "acrylate/graft(meth)acrylate" should read -- acrylate/graft (meth)acrylate --.

Column 14,
Lines 12-13, "uniform." should read -- uniform --.

Signed and Sealed this

Thirtieth Day of December, 2003

JAMES E. ROGAN
*Director of the United States Patent and Trademark Office*